(12) United States Patent
Tkacik

(10) Patent No.: US 8,068,644 B2
(45) Date of Patent: Nov. 29, 2011

(54) SYSTEM FOR SEEING USING AUDITORY FEEDBACK

(76) Inventor: Peter Thomas Tkacik, Fort Mill, SC (US)

( * ) Notice: Subject to any disclaimer, the term of this patent is extended or adjusted under 35 U.S.C. 154(b) by 1667 days.

(21) Appl. No.: 11/368,699

(22) Filed: Mar. 7, 2006

(65) Prior Publication Data
US 2007/0211947 A1 Sep. 13, 2007

(51) Int. Cl.
*G06K 9/00* (2006.01)
(52) U.S. Cl. ........................................ 382/114
(58) Field of Classification Search .............. 382/114, 382/232, 266
See application file for complete search history.

(56) References Cited

U.S. PATENT DOCUMENTS

| | | | |
|---|---|---|---|
| 3,562,408 A | 2/1971 | Collins | |
| 3,612,061 A | 10/1971 | Collins | |
| 3,766,311 A | 10/1973 | Boll | |
| 3,907,434 A * | 9/1975 | Coles | 356/141.4 |
| 4,254,776 A | 3/1981 | Tanie | |
| 4,322,744 A * | 3/1982 | Stanton | 348/62 |
| 4,390,756 A | 6/1983 | Hoffmann | |
| 4,972,501 A | 11/1990 | Horyu | |
| 4,979,508 A | 12/1990 | Beck | |
| 5,097,326 A * | 3/1992 | Meijer | 348/62 |
| 5,553,195 A | 9/1996 | Meijer | |
| 5,853,005 A | 12/1998 | Scanlon | |
| 5,878,154 A | 3/1999 | Schimmelpfennig | |
| 6,059,506 A | 5/2000 | Kramer | |
| 6,198,395 B1 * | 3/2001 | Sussman | 340/573.1 |
| 6,326,901 B1 | 12/2001 | Gonzales | |
| 6,430,450 B1 | 8/2002 | Bach-y-Rita | |
| 6,930,590 B2 | 8/2005 | Ling | |

* cited by examiner

*Primary Examiner* — Phuoc Tran

(57) ABSTRACT

The invention is a system whereby a video image can be converted into an audio signal. A portable apparatus is described which allows a visually blind person to hear the images and thus 'see'. This does not require expensive equipment nor does it require surgery. It has applications for non-blind people such as with a pilot seeing radar information. It can be performed with an inexpensive video camera, a portable computer, and earphones. It is also readily adapted to a customized and compact system involving a micro camera, specialized computer, and ear buds.

6 Claims, 6 Drawing Sheets

SYSTEM FOR SEEING USING AUDITORY FEEDBACK

BACKGROUND OF THE INVENTION

The present invention relates to human vision and alternatives for the blind in order to see using something other than the eyes. Visually impaired people have used devices for centuries to help them perceive the world. In these systems, the brain's plasticity performs a rewiring of the optical cortex in order to make this happen. It has been found that the blind person does not feel the forces in a cane handle but mentally translates this into a modified 'feel' of the surface of the ground on which the cane is sliding around.

Another example is the use of Braille which is a series of bumps 'read' by the blind as a form of written language. In skilled readers of Braille, the brain's plasticity alters perception such that several fingers move and sense like one large finger and the reading speed is quite fast.

More recently, other technical devices have become available. One such device is a cane that has a series of sonar devices that play a tone warning the user of imminent collisions.

New research is revealing the brain's plasticity to be quite adaptable. In a remarkable example developed by Bach-Y-Rita in a U.S. Federal government program, a video image was converted by a computer and played into a rectangular array of pins pressing out an image on a, person's back. In an alternate form, a dental retainer is used with an array of electrical stimulators which 'shock' the taste of an image onto a persons tongue. Although strange in its approach, this last technique has had some amazing successes.

Another promising direction in alternate mental inputs has been in the direct wiring of computers into the eye, the retina, the optic nerve, and into various parts of the brain. The obvious negative side of this approach is the required surgery involved in attaching to internal organs. One other negative risk relates to a test case where the misfiring of brain connectors resulted in research patients having seizures.

The plasticity of the mind is a powerful tool to achieve this. In a research project using Ferrets, (the small mammal), the optic nerve was cut on babies and rerouted to the portion of the brain normally used for auditory input. The Ferrets grew up with apparently, 'normal' vision. It is presumed that the brain is searching for signals providing spatial information and uses this to form mental images of the surroundings.

The brain of a baby Ferret (or a human) does not care whether the source of the nerve impulse patterns come as auditory, optical, or radar information as long as it provides the spatial reference needed to thrive. The brain is able to learn and translate impulses from the eyes as images and can translate other nerve impulses as well.

The crux of all this is that a tremendous amount of data is transferred to the human brain from sense organs we call 'eyes'. Alternative input devices must somehow deal with high information density and the prior art either has low data density as in canes or has high cost as in invasive surgery.

Therefore, there is a need for a cost-effective, alternative to seeing for blind people that takes advantage of the human brain's plasticity.

SUMMARY OF THE INVENTION

Accordingly, it is an object of the present invention to provide a cost-effective alternative for the blind person to see without the eyes.

It is a further object of the present invention to provide a system which uses an audio translation of an image so it can be 'seen' with the ears.

It is a further object of this invention to provide this translation continuously from a video camera and played into the ears.

It is a further object of this invention to provide this translation using readily available and inexpensive portable computer, web cam, and headphones.

It is a further object of this invention to provide a method for converting the audio signal which minimizes the image translation by compressing it without color, magnifying the central portion, and using various video compression algorithms.

It is a further object of this invention to describe a compact system in which all of the components are compressed into a simple eyeglass package.

It is a further object of this invention to add features to aid in the use of the system by providing collision feedback, night vision capability, and manual control to compensate for background noise.

The foregoing, as well as other objectives and advantages of the invention and the manner in which the same are accomplished, is further specified within the following detailed description and its accompanying drawings.

Blind users will be typically wearing sunglasses, item #2, and for this system, they will include a camera or cameras, #3 and #5. If the system as used includes sonar feedback for collision avoidance, then three sonar devices are recommended to be mounted on the forehead, the waist, and the feet, #4, #9, and #10.

To hear the audio interpretation of the video imagery, the user will need to be wearing head phones or ear buds as shown on the user's right ear by item #6. In a low budget version where a conventional computer laptop is used for processing of the video, it would probably be worn on a backpack as seen in item #7. The manual controls for background noise suppression, audio volume, and other sensitivity adjustments should be conveniently located for the user as exemplified by the wrist control in item #8.

Figure 1:
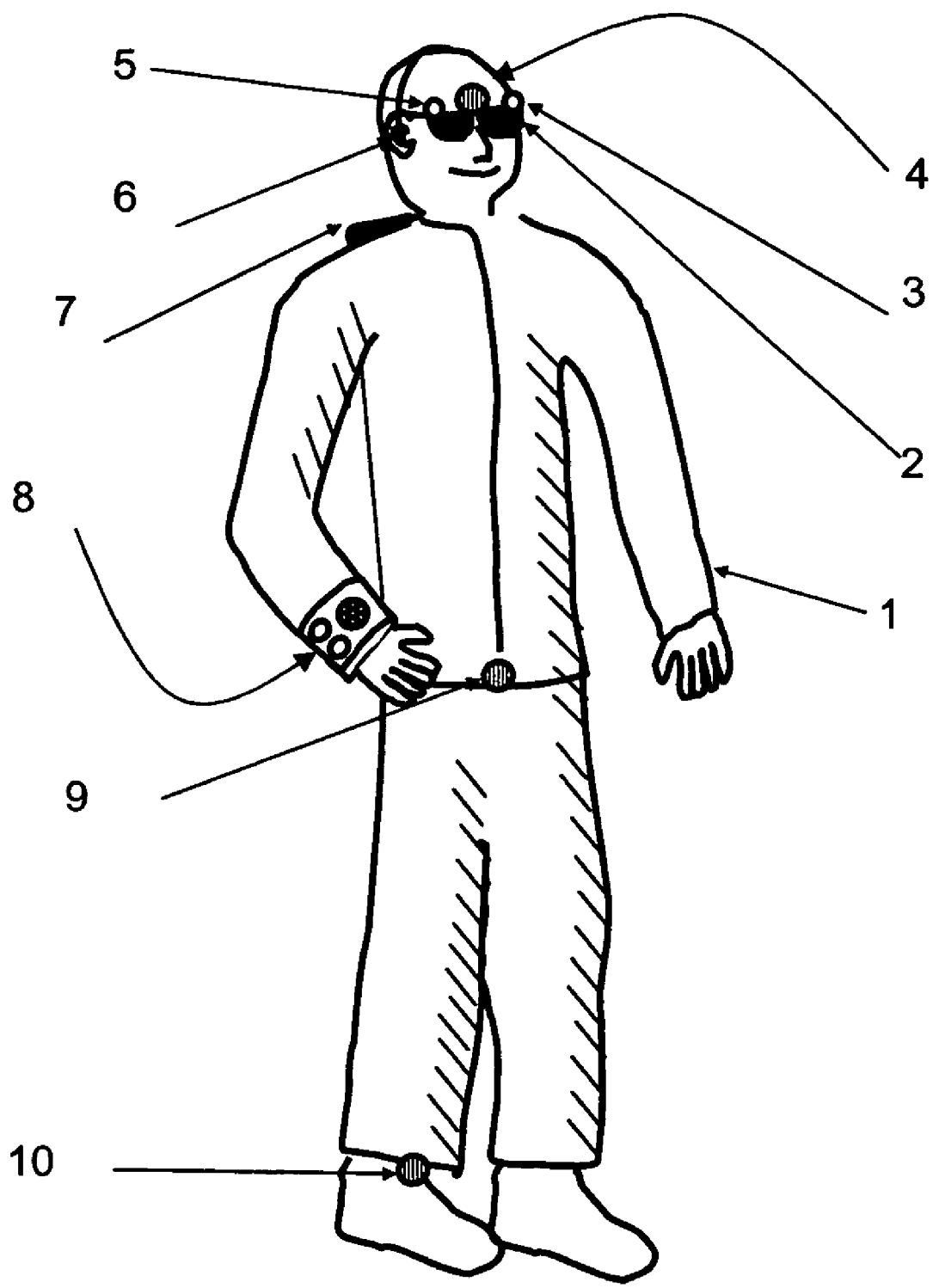
FIG. 1 is the arrangement of the devices to be worn by the user. Item number 1 is the person to be using the system.
Figure 2:
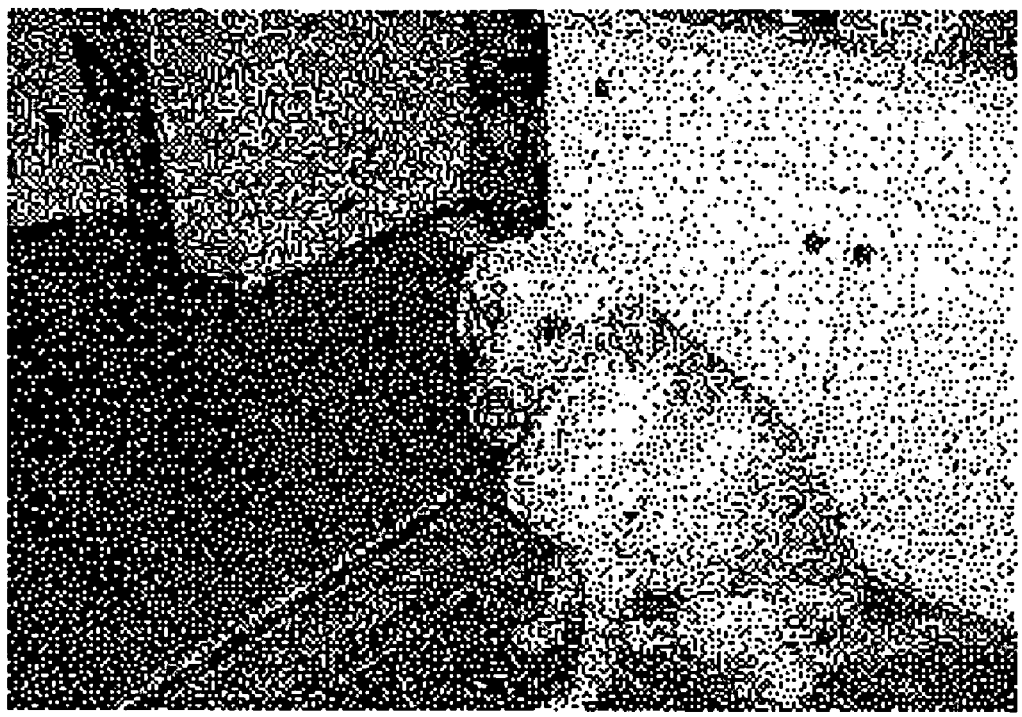

FIG. 2 is an example of an image the user might encounter, (in this case, a sitting dog).

Figure 3:

FIG. 3 is the modification of FIG. 2 due to the magnification (or fish eye) algorithm. The result is an expansion of the central portion of the image and no expansion at the perimeter.

Figure 4:
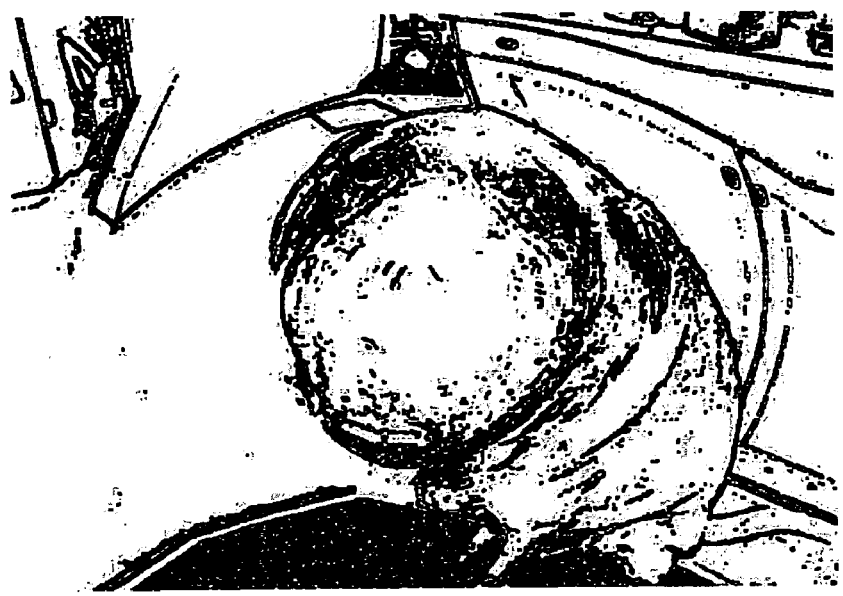

FIG. 4 is the further processing of the image by equalization, and edge detection. In this case, the busy pattern on the rug below the dog is full of edges and is therefore dark. In contrast, the edge algorithm is applied and results in an effect whereby the dark floor is no longer dark.

Figure 5:
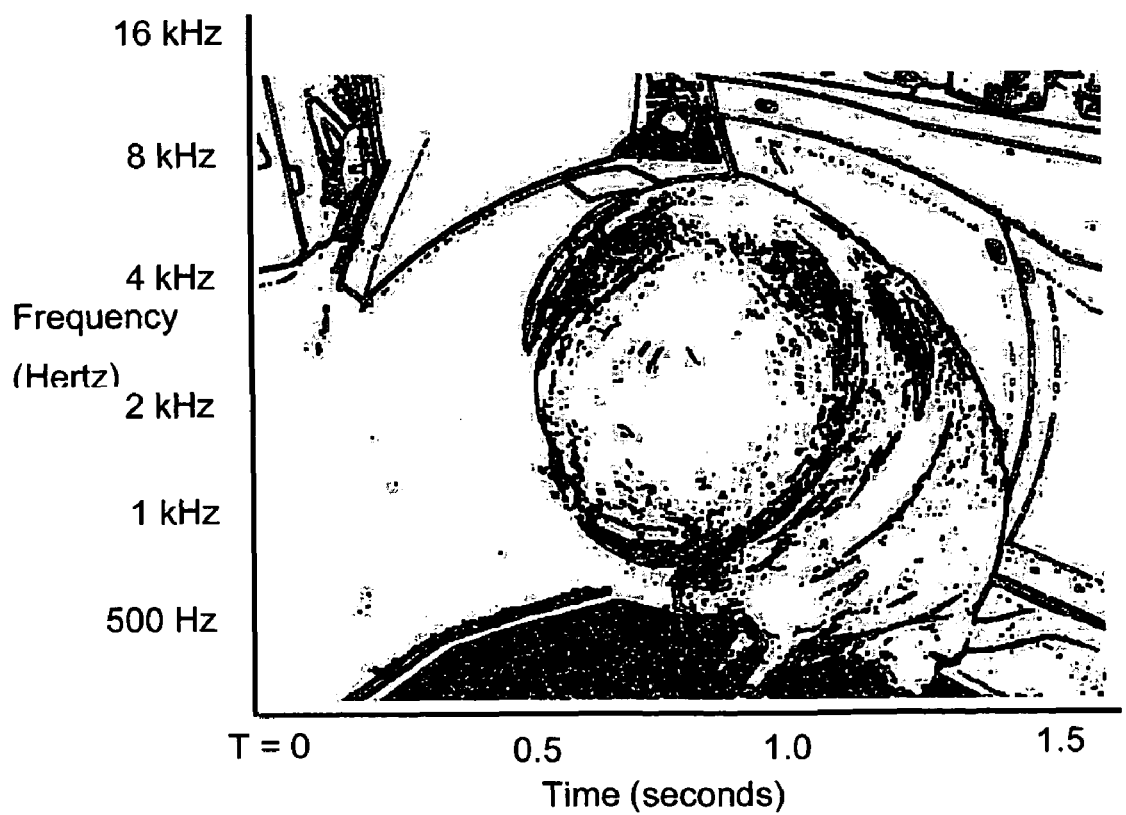

FIG. 5 is the further translation of the image into a sonogram. Edge detection is commonly used and calculated by people trained in the art of digital image manipulation. For clarity in the next drawing, the edge algorithm should be thought of as the derivative or the change in brightness in the spatial direction. The fine lines of a processed image could result in a very abbreviated audio signal so the edges in the image are increased in width to increase the audio playback duration or volume. The complete image is shown to take one and a half seconds to play.

The frequency range of the sonogram in FIG. 3 is from about 500 hertz up to about 16 kilo-Hertz. As the audio processing uses an inverse FFT transformation, the frequency range must be a power of 2 and so the actual range is from 1 Hz up to 16,384 Hz. However, if the image is broken up into 150 vertical bands, then each band is 10 milliseconds long and the minimum frequency playable is 200 Hz. This range should be adjustable to accommodate specific user hearing loss both in range and in playback frequency response.

Figure 6:
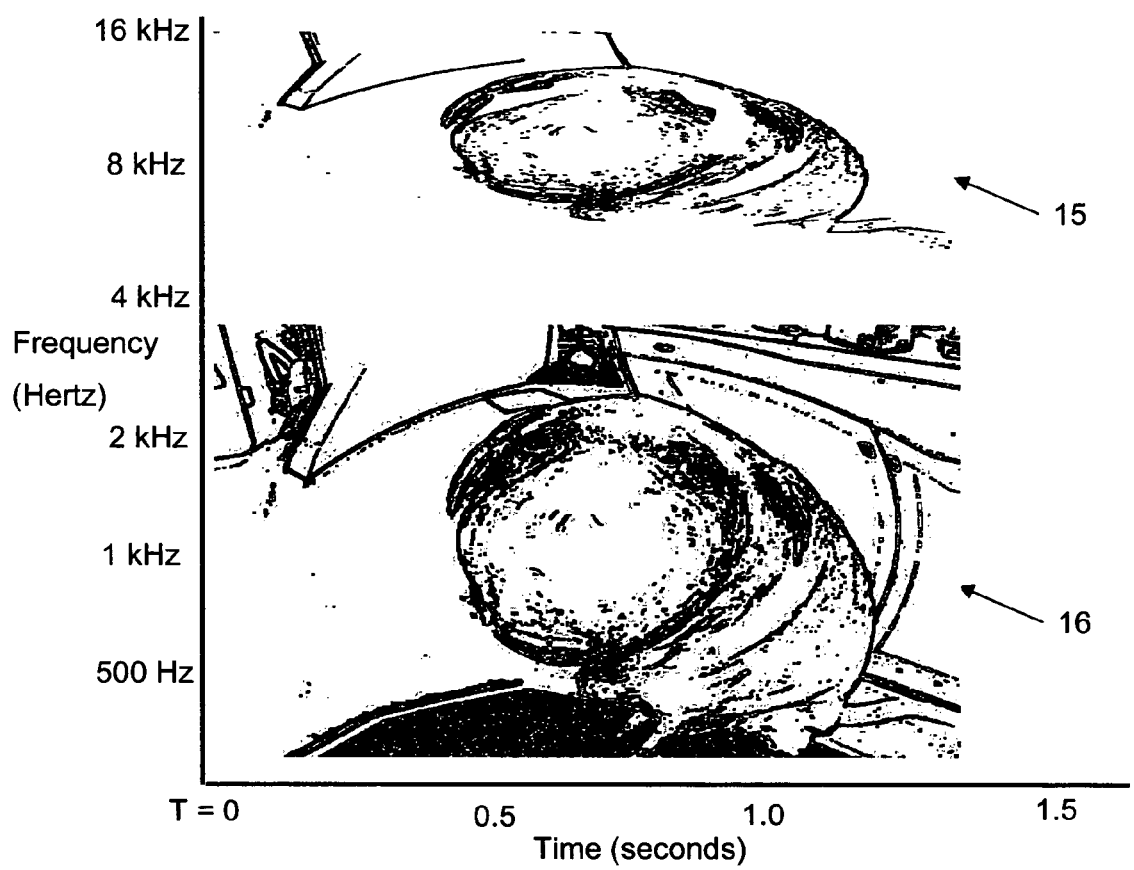

FIG. 6 is the further processing of the image into a multiplexed sonogram. As with the sonogram in FIG. 5, item #16 is the shape information of the image generated through edge detection algorithms and it is played in the frequency range up to about 2,500 Hz. However, the human brain processes images from the eyes into three parts; shape information, color information, and motion information. FIG. 6 has a multiplexed sonogram with the addition of item #15, the motion information, which is played above the shape information in the frequency range above 2,500 Hz and up to about 16,000 Hz. Instead of using an edge detection algorithm, which is the derivative in the spatial direction, the motion algorithm is the derivative in the temporal direction. That is, the change in brightness of a point in the image as time goes on.

The value of this is that it provides more visual information by supplying the motion information separately. That is, it circumvents the video processing delays in image presentation and playing, and plays that information directly to the user.

Figure 7:
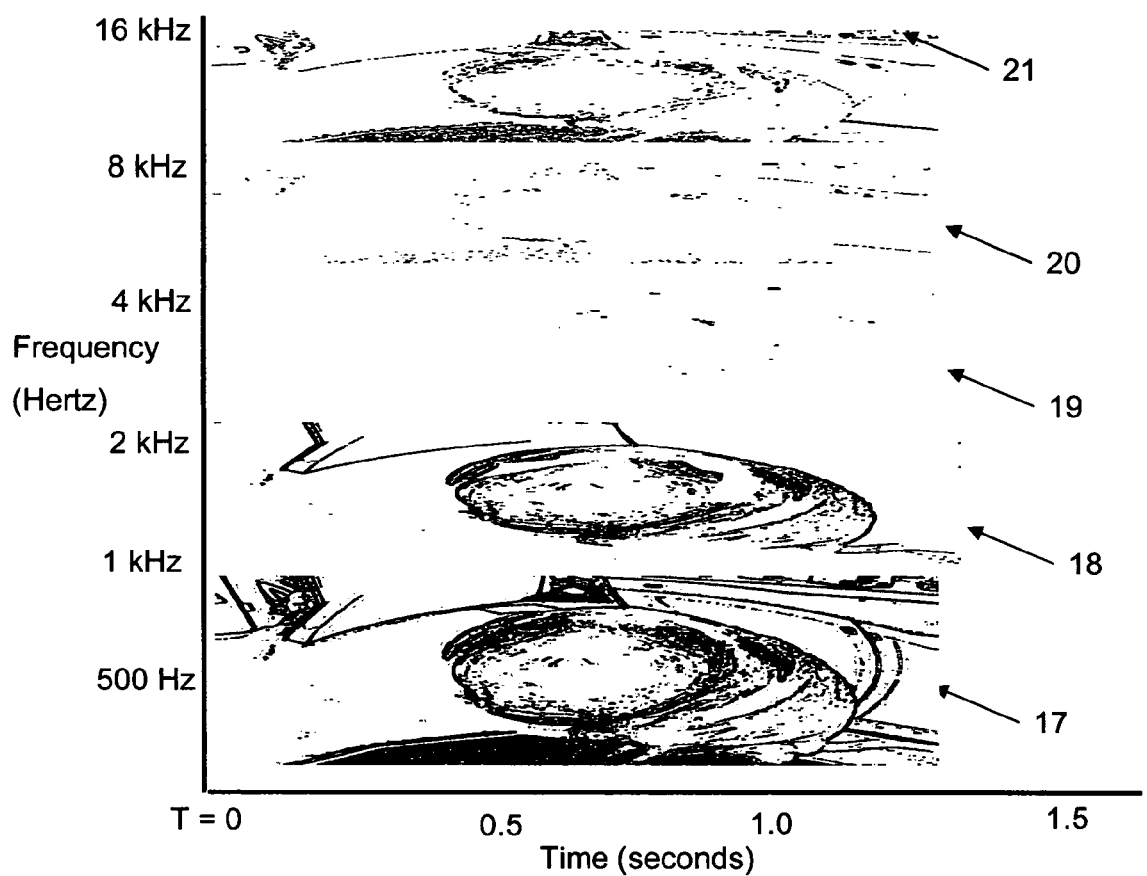

FIG. 7 is the further processing of this information with color information multiplexed as well but at the tradeoff of vertical image resolution. Item #17 is the Fish-eye magnified, edge defined, intensified, original image shown at a frequency range up to about 800 Hz. Item #18 is the motion portion of the image described in item #17. Items #19, #20, #21 are the version of item #17; however, instead of being an edge definition, they are the red, yellow, and blue separations. N.B. Video cameras break up color into red, green, and blue however, the mind breaks up color into the primary colors, red, yellow, and blue.

Figure 8A:
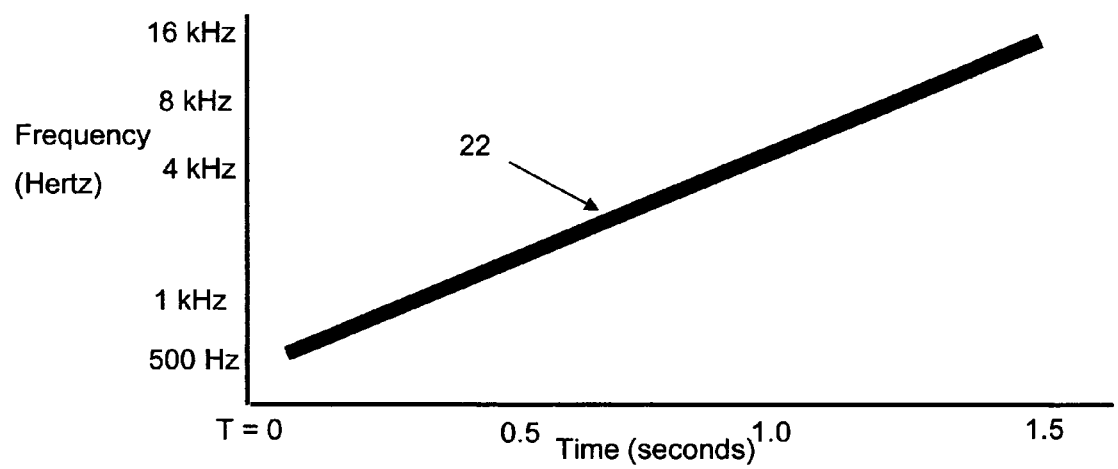

As a clearer example of the sonogram to audio translation, FIG. 8A is an image with only one optical component, a dark diagonal line from lower left to upper right. As a sonogram, it has been shown plotted as frequency versus time.

Figure 8B:
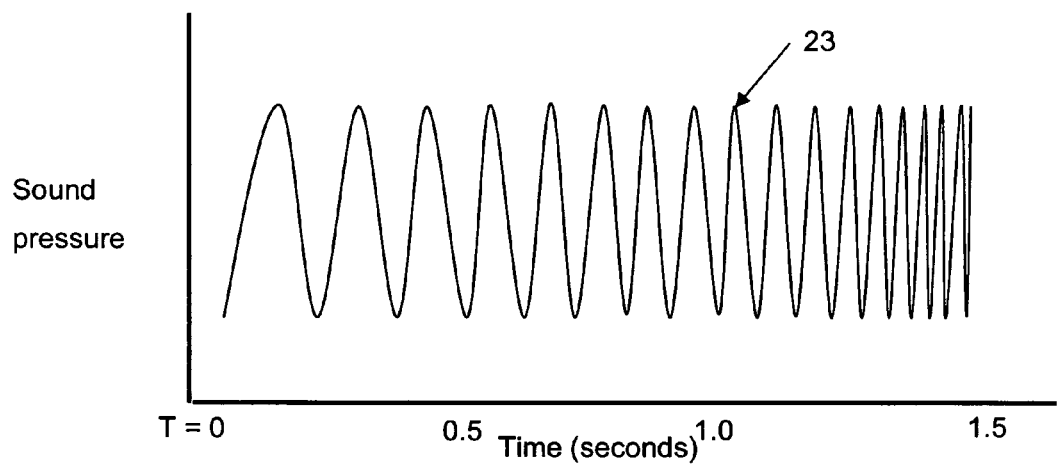

FIG. 8B is the audio version of this very simple image and is shown as a single waveform with frequency (or wavelength) steadily rising (or shortening) with time. Of course, a real image would form a very complex wave form, much like an image of a single piano key with its many harmonics overlaid on top of each other.

DETAILED DESCRIPTION

In the proposed embodiment, this invention is a computer modified video image that plays as an audio signal into a persons ears'. As such, it provides a person with video information without using the eyes. It also bypasses many of the negative side effects and high cost of the newer high technology solutions.

As set forth herein, the invention preferably includes a portable computer, a digital video camera, and a pair of head phones.

In one form, this system is able to utilize an inexpensive webcam plugged into a portable laptop computer and played out on regular ear bud style headphones. The laptop reads the streaming images from the camera and translates them into audio format. These are then played by standard ear buds worn by the vision impaired person. There is no need for expensive hardware nor invasive surgery.

In another application, this system can be used by people that need to see for other reasons such as fighter pilots in battle. In these modes, the images might be of non-optical sources such as radar or resource information. In these cases, visual seeing would be maintained.

In one modification, and since the visual image presented by this system could be fairly low resolution, the inherent infra-red sensitivity of common CCD video cameras would be utilized (rather than filtered with the usual IR glass) and improve the night vision capacity of the wearer. This elimination of the usual IR filtering glass would partially compensate the blind wearer and be another low cost feature of this approach.

In order to obtain background compensation, there may be two microphones listening to the outside world. If a loud sound interrupts the user, the audio system would adjust to improve the imaging or in the opposite mode, the ability of the user to hear important sounds. That is, it could be programmed to overpower loud background noise or quiet down to allow the listening to a question posed by an associate.

In overpowering background noise, partial compensation could be made by using commercially available background noise compensation headphones. These send counter sound waveforms to neutralize background noise and work particularly well in environments with loud droning noises.

Another advantageous modification is the addition of sonar feedback like with the alarm canes. These could be played directly into the headphones as a warning for collision at the foot level (trip hazards), the waist, and a head level.

Due to the obvious need for manual tuning to suit special situations, a manual control could be made available to the wearer in order to compensate for background noise, desire to hear background noise, increased resolution imaging, increased update speed (more image frames per minute), or increased warning level for approach of collision objects. This might simply be a wristwatch control panel or an alternative input control.

In a more developed solution, the complete system could be miniaturized and fit into a simple pair of glasses. These could include a camera, the audio conversion computer, microphones, sonar, and earphones. Radio telemetry from sonar devices and the wrist panel could eliminate the need for wiring hassles.

In another embodiment, the invention is a video to audio translation algorithm which allows the user's brain to see a translated image.

The main goal of the software algorithm is to convert the video signal into useable audio tracks. One audio format suggested is to break the normal video source from its current raster format (484 horizontal lines of video dots for the U.S. format NTSC) into a reduced number of horizontal bands. This might be achieved by averaging several lines or more adaptive methods could be used. The audio signal corresponding to each horizontal video band would basically coordinate with the amplitude of the audio signal increasing and decreasing as the brightness of the video band increases and decreases.

The audio signal (corresponding to horizontal video information) would then be swept laterally from right to left (or vice versa) like sweeping on a stereo 'balance' control by playing in one ear and then diminishing the volume and simultaneously increasing the volume from zero to full in the other ear.

In another embodiment of this lateral sweep would be to apply a sweeping phase shift to a constant volume audio signal and allow the brain's sensitivity to phase shift to read the lateral composition of the sound. That is, since sounds arrive at the right ear a fraction of a second sooner from sources on the right, our brains have developed the ability to sense this time delay and it could be applied to the audio sweep. It could also be modified from the normal fractional millisecond shift to achieve greater mental separation.

Providing vertical image sensitivity could then be done by modifying the carrier frequency. Each horizontal image band audio signal could be played as a tone of varying intensity and the tone frequency would change with vertical position on the image. That is, if playing image bands down an image, the right to left sweeping bands of sound would drop in background frequency while scanning down the image. This provides mental feedback to the vertical orientation of the audio scan lines.

Another embodiment reads complete images as sonograms, (like seen in the classic Golden Books, 'Field Guide to Birds of North America'). Sonograms are plots of frequency on the vertical axis and time on the horizontal. For example, a Blue Jay's sonogram might look like a row of horizontal commas. An image as a sonogram would then be converted by a inverted Fast Fourier Transform (FFT) into audio wave forms and played into the ears. As an example, a diagonal line across a field of view might be played as a climbing tone.

If phase shift is used to delineate right from left image, the sonogram approach would allow the use of two horizontally separated cameras for stereo vision. This could allow the triangulation of objects that good seeing eyes have and provide 3-D information about objects, (distance, collision probability, size assessment, etc.).

An alternate approach to video to audio conversion is to convert the video image directly into an audio sequence. In this playback format, the audio signal is more akin to the audio feedback a Bat (the flying mammal) gets through Echolocation. This utilizes many complex interactions of frequency, phase shift, etc. When Bats fly into a cave and approach their landing site. It is known that their clicking sounds increase in frequency to provide them with greater image resolution. This, they will need if they are to do a back flip and grab on to a wall with their feet whilst upside down. The question of adapting complete image playback is not fully explored in this invention.

Either way, the image to be 'heard' is very complex from a data transfer standpoint. In order to pack more of the image data into the audio signal, several compression algorithms can be used.

The audio signals played could be of a modified image. Just as there are more rods and cones in the central part of a human eye's retina, the image would be distorted to have a magnified central portion (fish eye lens effect). This would allow spending more of the imaging (audio) time in the central critical area of the image.

As with the human eye, this central magnification would also allow improved shape recognition because the number of pixels of approaching shapes would be size invariant, (to a point, and only at the image center). This is partly why we recognize approaching objects so readily when looking right at them.

In another embodiment, there would be a microphone listening to the outside world. If a loud sound interrupts the user, the audio system would adjust to improve the imaging or in the opposite mode, the ability of the user to hear important sounds. That is, it could be programmed to overpower loud background noise and quiet down to allow the listening to a question posed by an associate.

In addition, in order to reduce the needed complexity of the video/audio image, the image would be converted to grey scale and then to an edge detection image. The visual format would be a grey image with lines only at edges of objects. The audio version would be the sweeping monotones with louder pulses at the edge locations. The center magnification would be part of the sweeping monotones.

Experiments on update frequency reveal that on a 8 m wide path, an updated image played at one frame per five seconds provides excellent feedback, one frame per ten seconds provides marginal feedback, and one frame per fifteen seconds results one the wandering path of a drunkard (not wandering off the course but never resulting in a center line path). Updates of once per fifteen seconds is considered poor update frequency.

In the Bat (flying mammal) mode, the audio signals would be complex frequency, phase shift, and left to right sound patterns which would directly generate the imagery. In these audio signals, a continuous audio image (at much greater than once per fifteen seconds) can be generated but the signal would be complex and the learning curve to comprehension, slow.

Thus, those having ordinary skill in the art would recognize the value of a simple 'seeing' system for the blind and that it should be low cost, easy to use, easy to learn, provide audio compensation, and provide image resolution useful to the blind for seeing.

In the specification and drawings, there have been disclosed typical embodiments of the invention and, although specific terms have been employed, they have been used in a generic and descriptive sense only and not for purposes of limitation, the scope of the invention being set forth in the following claims.

The invention claimed is:
1. A computer-implemented method for converting digital video information into an audio format comprehensible by blind people as video information, said method comprising:
    (i) a step for compressing the running video frame;
    (ii) a step for converting a compressed video image frame into a sonogram by reading the horizontal direction of the image as the time function and the vertical direction of the image as the frequency function;
    (iii) a step for converting the sonogram into an audio format by performing a frequency to amplitude conversion on each vertical line of the sonogram and writing the audio stream for the image frame;
    (iv) a step for separating the image audio file into two audio files modified to give lateral position feedback into the left and right ears, wherein the lateral position is provided by playing the audio image information with phase shift corresponding to sounds heard to the left and right of the listener.

2. The computer-implemented method of claim 1, wherein the step for compressing includes central magnification, edge enhancement, conversion to black and white, and threshholding.

3. The computer-implemented method of claim 1, wherein the sonogram is split into two parts, the spatial defining image portion presented at a lower frequency range and the image motion component information presented at the same time but at a higher frequency range.

4. The computer-implemented method of claim 1, wherein the sonogram is split into three to five parts, the spatial defining image portion presented at a lower frequency range, the image motion component information presented at the same time but at a higher frequency range, and the color information played at even higher frequencies and including distinct red, yellow, and blue separation.

5. The computer-implemented method of claim 1, the method further comprising steps of: foregoing the sonogram conversion and playing sequences single frequency streams corresponding in amplitude to the brightness of vertically displaced horizontal image bands and playing across the image band and in sequence from the image top to bottom where the amplitude varies with image band position brightness and the single band frequency drops with vertical position of the image band.

6. A system for converting digital video information into an audio format according to claim 1, said system comprising:

(i) a video source for providing an electronic output;

(ii) a computer for processing the computer-implemented method according to claim 1;

(iii) a pair of audio ear speakers from which, the user is to listen;

wherein the computer uses the input from stereo video sources spaced laterally apart and played into the left and right ears in order to provide three dimensional video information to the user.

\* \* \* \* \*